March 9, 1954  I. W. COX  2,671,839
USER-ADJUSTABLE AUTOMATIC CONTROL
Filed Dec. 6, 1951  3 Sheets-Sheet 1

INVENTOR.
IRVIN W. COX
BY
ATTORNEY

March 9, 1954     I. W. COX     2,671,839
USER-ADJUSTABLE AUTOMATIC CONTROL
Filed Dec. 6, 1951     3 Sheets-Sheet 2

*INVENTOR.*
IRVIN W. COX
BY
ATTORNEY

March 9, 1954  I. W. COX  2,671,839
USER-ADJUSTABLE AUTOMATIC CONTROL
Filed Dec. 6, 1951  3 Sheets-Sheet 3
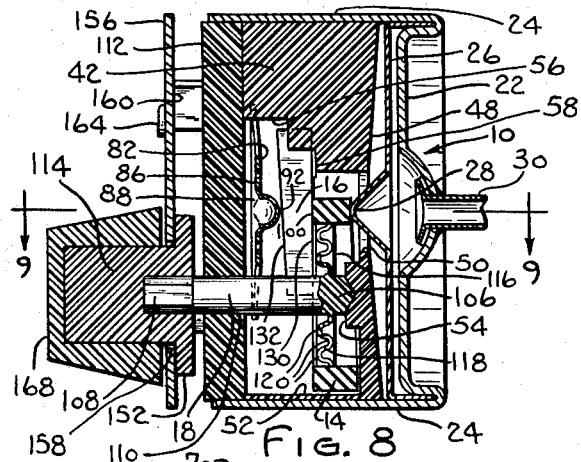
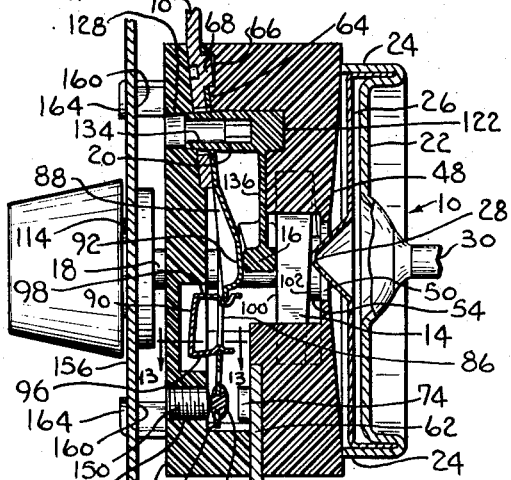
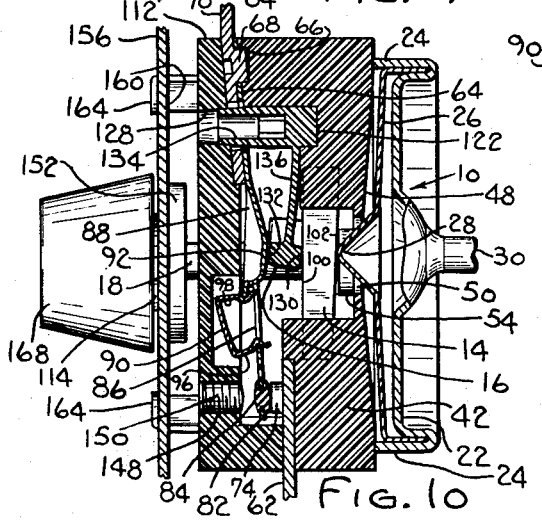
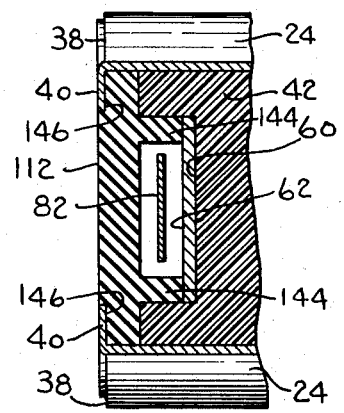
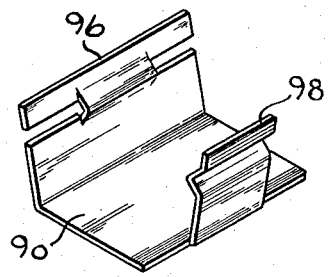
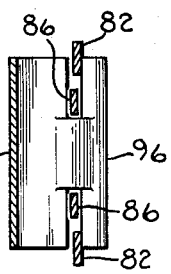
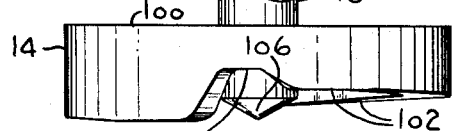
INVENTOR.
IRVIN W. COX
BY
ATTORNEY Patented Mar. 9, 1954

2,671,839

UNITED STATES PATENT OFFICE 2,671,839

USER-ADJUSTABLE AUTOMATIC CONTROL

Irvin W. Cox, West Allis, Wis., assignor to Cutler-Hammer, Inc., Milwaukee, Wis., a corporation of Delaware Application December 6, 1951, Serial No. 260,161

21 Claims. (Cl. 200—140)

1

This invention relates to improvements in user-adjustable automatic controls, and more particularly for regulating temperature, pressure or other conditions, as, for example, controls adapted for use in domestic refrigerators.

Controls of this type use a power element operable in response to changes in temperature to open and close an electric snap switch. Such controls also employ a manually adjustable mechanism to select the approximate temperatures at which the power element will cause operation of the switch. However, the control and its adjusting mechanism should be reasonably accurate, simple to operate, durable, require a minimum of space, be easy to manufacture and assemble, and include a simple factory adjustment.

It is the object of this invention, therefore, to provide such a user-adjustable automatic temperature control which has all of the foregoing features and characteristics.

The adjusting mechanism of such control utilizes two cams which are alined between a boss on the diaphragm of the power element and a switch actuator to directly transmit motion from the diaphragm to the actuator. The first or user-adjustable cam is relatively long so that considerable movement is required to effect any desired adjustment. When adjusted the second or factory adjustment cam remains set and there is no provision for its adjustment by the user. Both cams are made of a durable material which preferably has self-lubricating properties. Each cam is secured to its adjusting means by a flexible section so that both cams are jointly bodily movable between the boss on the diaphragm and the switch actuator without disturbing their adjusted positions. This arrangement simplifies the mounting structure, lessens space requirements, and facilitates assembly. Such arrangement also lessens the number of parts required and increases the accuracy of the device.

The power element has a housing for the diaphragm which: houses the insulating support for the snap switch and adjusting mechanism; accurately gauges and fixes the distance of the snap switch from the power element; and securely holds an escutcheon plate functioning also as a support for the control.

Although only one embodiment of the invention is shown and described herein, it is to be understood that various changes may be made in the details of construction of the device without departing from the spirit of the invention or scope of the appended claims.

2

In the drawings,

Fig. 8 is a sectional view taken on line 8—8 of Fig. 5;

Fig. 9 is a sectional view taken on line 9—9 of Fig. 8 showing the relationship of the parts with the snap switch opened;

Fig. 10 is a sectional view similar to the view of Fig. 9 showing the relationship of the parts with the switch closed;

Fig. 11 is a fragmentary sectional view taken on line 11—11 of Fig. 5;

Fig. 12 is an enlarged perspective view of the spring compression member of the electric snap switch;

Fig. 13 is a fragmentary enlarged sectional view taken on line 13—13 of Fig. 9; and Fig. 14 is a fragmentary enlarged view in side elevation of the user-adjustable cam.

Figure 1:
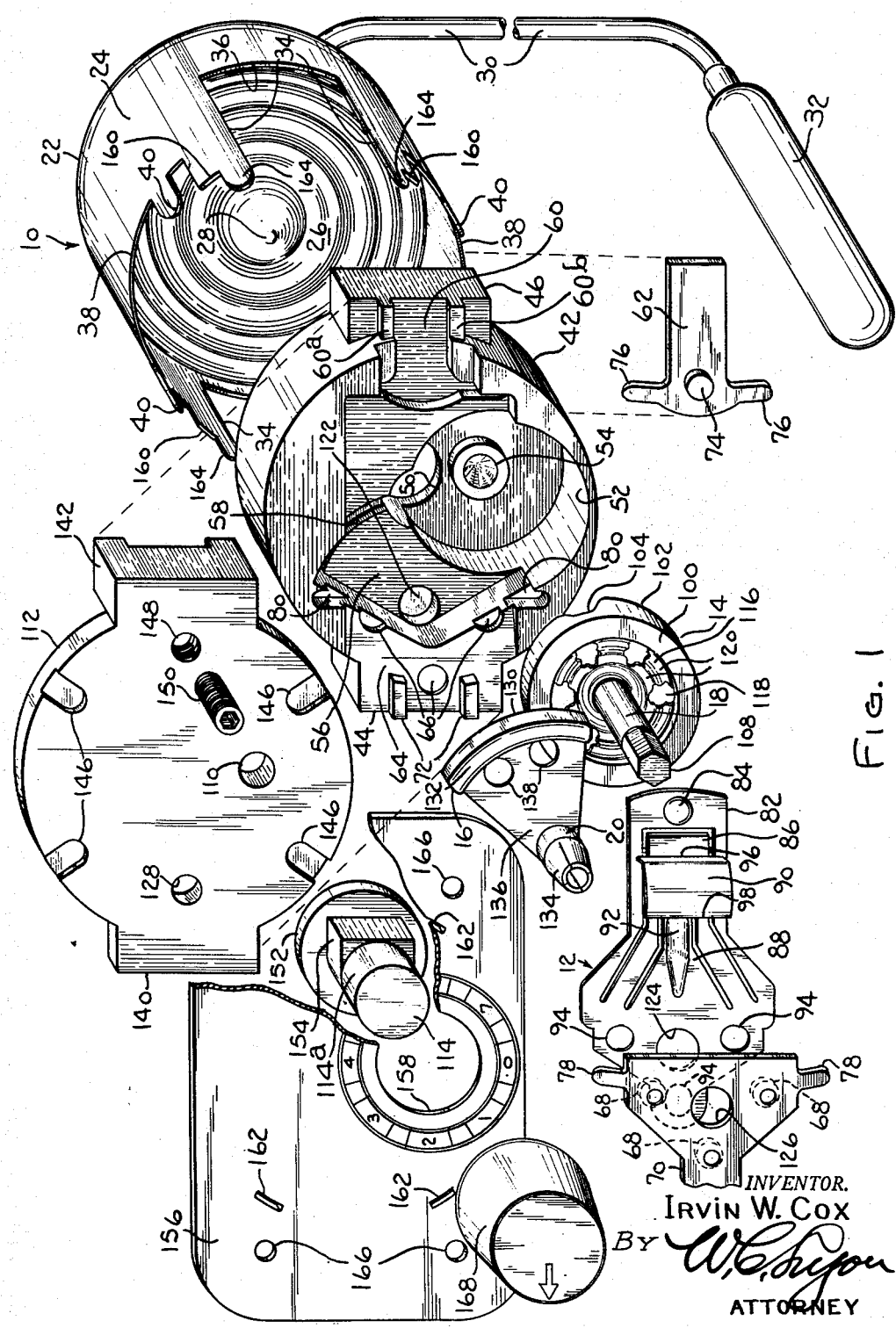
Figure 1 is an enlarged exploded view of an automatic control device embodying the present invention.
Figure 2:
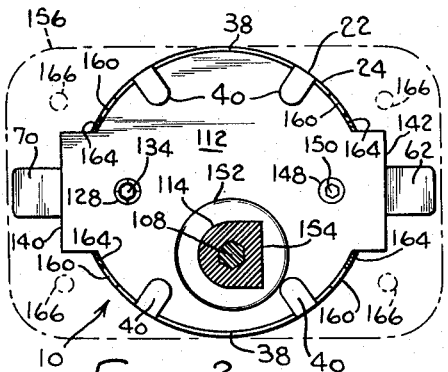
Fig. 2 is a sectional view taken on line 2—2 of Fig. 3, the escutcheon plate being shown in broken line for the purposes of clarification.
Figure 3:
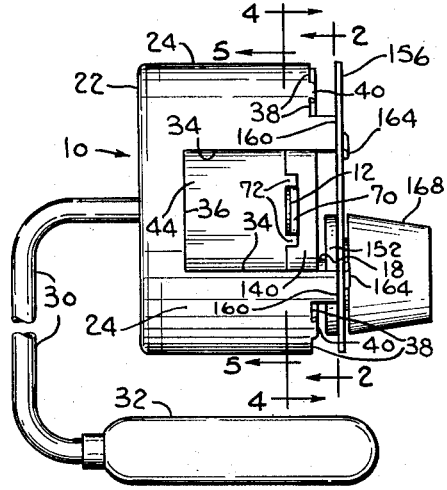
Fig. 3 is a view in side elevation of such automatic control device.

The automatic control shown in the drawings is designed particularly for use in controlling the temperatures of domestic refrigerators. It has a power element 10 which, responsive to changes in temperature in the refrigerator, supplies the motivating force to actuate an electric snap switch 12 for controlling the motor driving the compressor. The transmission of motion between the power element and the switch is accomplished by a pair of cam members 14 and 16 positioned therebetween. These cam members are individually adjustable to vary the combined thickness thereof. Each of the cams 14 and 16 is adjusted by an operating stem 18 and 20, respectively. The stems are connected to their respective cams in such a manner as to transmit rotary or angular movement therebetween while also permitting axial movement of the cams relative to the stems.

The power element has a housing 22 including a peripheral wall 24. A flexible diaphragm 26 is seated in the housing and has a centrally positioned laterally projecting boss or cam follower 28 the apex of which is a spherical section which engages the user-adjusting cam 14 to transmit motion thereto. A capillary tube 30 has its inner end connected to the housing 22 and its outer end connected to a bulb 32 containing a thermally responsive fluid. The power element 10 is preferably constructed in the manner disclosed in my copending application, filed November 19, 1951, Ser. No. 257,100. The extended wall 24 has opposed slots 34 the bottoms 36 of which provide a gauge for accurately positioning correspondingly shaped molded insulating supporting members within the housing in proper relation to the power element. The upper edge 38 of the housing has tabs or projections 40 which are adapted to be bent over to rigidly hold the insulating members in assembled position.

One of the molded insulating supporting members has an inner body portion 42 snugly fitting within the housing 22 and having two opposite extensions 44 and 46 which fit within the slots 34 and rest snugly on the bottom edges 36 to accurately determine the distance of such member from the diaphragm 26. As is indicated at 48 (see Fig. 8), it is preferable to inwardly dish the outside of the bottom of the body 42 to provide sufficient operating space for the diaphragm 26. The bottom of the body 42 also has a central opening 50 through which the boss 28 projects to contact the user-adjustable cam 14. The body 42 is provided with a circular recess 52 the center of which is offset from the center of such body. This recess provides operating space for the user-adjustable cam 14 and is so offset to place the cam 14 in alinement with the boss 28. A bearing 54 is formed at the bottom of such recess to rotatably receive and guide the inner end of the stem 18. A pie-sectored recess 56 is also formed in the body 42 with its sector sufficiently offset from the center line of such member to keep the cam 16 in alinement with the offset portion 92 on the switch actuator 88, the cam 14 and the boss 28. The bottom of such pie-sectored recess provides a limit for movement of the cam 16 away from the switch. The bottom of such pie-sectored recess also has an arcuately extending groove 58 which provides operating space for the cam 16. The body 42 and the projection 46 are both recessed to provide a seat 60 for a terminal 62. The face of projection 44 and a recess in the body 42 jointly provide a seat 64 for the switch part 12. The bottom of the seat is sloped as shown in Figs. 9 and 10 so that the switch part 12 is angled toward the terminal 62. Within this seat are indentations 66 which cooperate with lugs 68 on a terminal 70 to assist in holding such terminal and the electric snap switch part 12 in position. Raised guides 72 on the projection 44 engage the edges of terminal 70 to properly aline such terminal. Similarly raised guides 60ᵃ and 60ᵇ are formed on the seat 60 of projection 46 to engage the edges of terminal 62. The terminal 62 carries a fixed contact 74 and has arms 76 held in similarly shaped recesses in the seat 60 to assist in positioning such terminal. The terminal 70 likewise has arms 78 which snugly fit in similarly shaped recesses 80 adjacent the seat 64 to assist in locating the terminal 70.

The electric snap switch mechanism is preferably constructed in accordance with the teachings of the disclosure in my copending application, Ser. No. 205,292, filed January 10, 1951. I have herein shown such a switch having a contactor arm 82 carrying a movable contact 84, a flipper arm 86, and a switch actuator 88. The actuator 88 and the flipper 86 are interrelated through a spring 90 which effects the snap action of the contactor arm 82. The actuator 88 is provided with an offset portion or cam follower 92 which is in alinement with the factory-adjustment cam 16 and is engaged thereby in the operation of the control. The extrusions or lugs 68 on the terminal 70 extend through apertures 94 in the switch part 12 to lock such switch part in position on the sloping seat 64 with the contact 84 in alinement with the fixed contact 74. When no pressure is exerted on the offset portion 92 the switch part 12 will always remain in or snap into open position (Fig. 9). This is brought about because the slope of the switch part 12 normally causes the contactor arm 82 to be sufficiently sprung by the fixed contact 74 as to provide for jointly effecting positioning of the outer end 96 of the spring 90 and the end of the flipper arm 86 for circuit interruption, as shown in Fig. 9. That is to say, the inner end 98 of the spring 90 and the end of the actuator 88 assume such circuit interrupting positions when such actuator is released to assume its normal position. Thus the switch 12 will be closed only when the actuator 88 is moved against the bias thereof by the power element.

One of the important features of this control is the simple and effective means for adjusting the control both as to factory-adjustment and as to user-adjustment. The user-adjustable cam 14 consists of a ring the opposite sides of which are spaced apart different distances at various angular points around the cam. One side 100 of the cam surface (Fig. 14) may lie in a given plane and the other side 102 may slope with respect thereto, as shown. A low point 104 is provided to afford an "off" position for the control. The pitch is gradual and rises approximately .065 of an inch in about 300 degrees of rotation. The cam 14 is operated by the stem 18 one end 106 of which is cone-shaped and fits in the bearing 54 and the other end 108 of which projects through a hole 110 in the molded insulating cover 112 and said end 108 is of polygonal form in transverse cross section to receive a correspondingly recessed coupler 114. The cam 14 and stem 18 are connected by a thin, disc-like integral web 116. It is desirable to provide a plurality of openings in this web as at 118 and one or more annular corrugations 120 so that the cam 14 may have relative movement axially of said stem with negligible force required to effect such movement. The purpose of such movement is to permit the cam to travel with the boss 28 and the offset portion 92 of the switch actuator 88 without causing longitudinal movement of the stem. In other words, the cam may be said to float with respect to the stem. The shape and pitch of the cam is determined by the particular application of the control. In this instance, i. e., a domestic refrigerator control, the cam has a relatively long travel and low pitch. The purpose of this is to permit a large angular movement for a relatively small adjustment. Thus the space between the graduations on a visible scale may be enlarged and the chance of error eliminated. It may be desirable to have a defrost position and this may be accomplished by the low cam portion 104. When the cam 14 is positioned so that this low portion 104 is opposite the boss 28, no force can be transmitted to the electric switch which will then be in open position. Starting from this open position, if the cam is rotated in a clockwise direction (Fig. 1) the thickness of the cam increases. Consequently the switch will be opened at a lower temperature as the clockwise movement is continued, inasmuch as the diaphragm boss 28 will cause the switch actuator 88 to effect closing of the circuit at a point closer to the position of the diaphragm when unexpanded.

It is desirable to have a factory adjustment for the purpose of initially calibrating the control. The factory adjustment cam 16 consists of an arcuate sector positioned between the user-adjustable cam 14 and the offset portion 92 of switch actuator 88. It may have a side 130 located in a given plane which rides on the side 100 of cam 14 and a side 132 which slopes with respect to side 130 and bears on the boss 92. The pitch of said sloping side 132 is slight, rising about .022 of an inch in about 75 degrees of rotation. Both sides 130 and 132 should be provided with a crowned surface (see Figs. 9 and 10) so that as the cam is tilted when moved axially relatively to its stem the desired adjustment will not be appreciably affected. The stem 20 has an inner end rotatably mounted in a recessed bearing 122 in the seat 56 and its outer end loosely extending through a hole 124 in the switch part 12 and a hole 126 in the terminal 70 with a slitted tapered tip 134 frictionally engaged in a hole 128 in the insulating cover 112. The outer end of the stem is hollow and includes a hexagonally recessed portion into which an Allen wrench or other suitable adjusting tool may be inserted through the hole 128 to rotate stem 20 and thereby adjust the cam. The cam 16 and the stem 20 are interconnected by a pie-sector shaped, thin web 136 which is sufficiently strong to transmit angular rotation between the stem and the cam and yet thin enough to permit the cam 16 to have axial movement relatively to the stem 20. The flexibility of the web may be enhanced by apertures 138. Thus the cam 16 floats back and forth in the axial line between the power element and electric switch actuator 88 along with the customer-adjusting cam 14.

The cams 14 and 16 are made of durable material preferably having self-lubricatng qualities. Molded composite material or molded powdered metal, such as aluminum, may be used. However, I prefer to make the cams, the stems and the interconnecting webs as a single integrally molded piece, and I have found that molded nylon supplies the qualities of durability, self-lubrication, and satisfactory flexibility.

Figure 4:
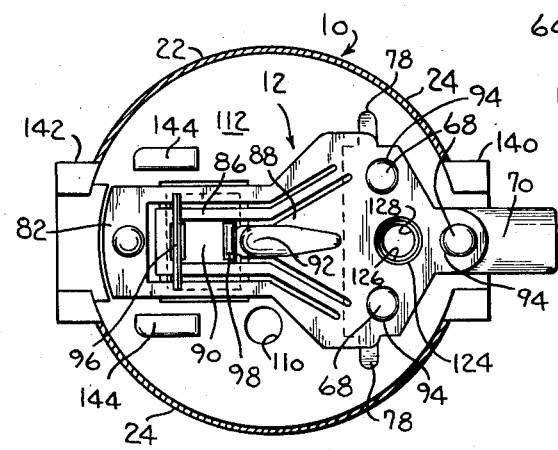
Fig. 4 is a sectional view taken on line 4—4 of Fig. 3, which line meanders to conform with the parting line between the insulating support and insulating cover.
Figure 5:
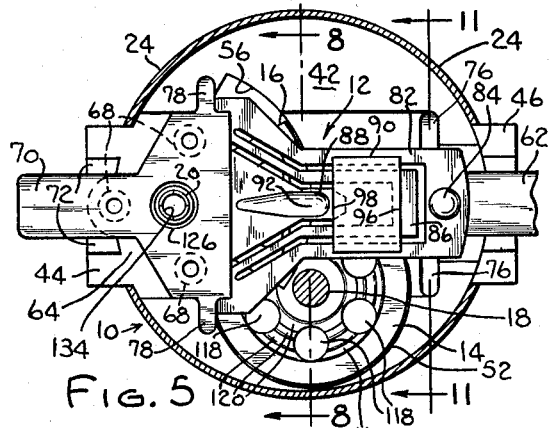
Fig. 5 is a sectional view taken on line 5—5 of Fig. 3, which line meanders the same as line 4—4.
Figure 6:
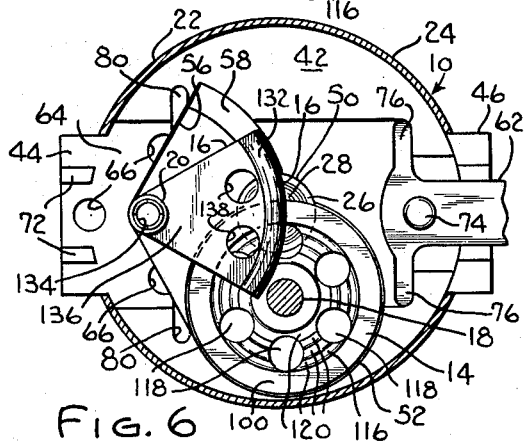
Fig. 6 is a sectional view similar to the view of Fig. 5 with one of the terminals and portions of the electric snap switch removed to more clearly show the adjusting mechanism.
Figure 7:
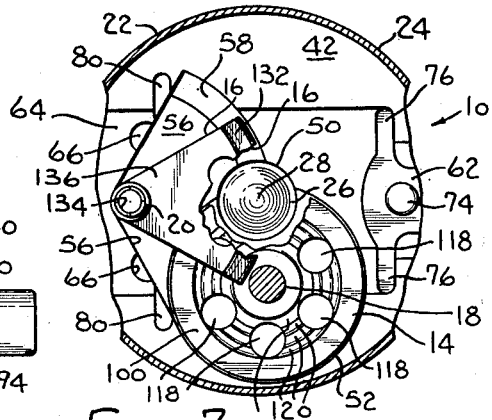
Fig. 7 is a fragmentary sectional view similar to the view of Fig. 6 with parts being broken away for the sake of clarity.

The insulating cover 112 seats on the inner body 42 of the insulating support and has projections 140 and 142 which interlock with the projections 44 and 46, respectively, and also fit within the slots 34 of the housing 22. Lugs 144 (see Figs. 4 and 11) on the underside of the cover 112 rest on the arms 76 of the terminal 62 and also engage the walls of seat 60 to hold the terminal in place and properly locate the cover on the body 42. The underside of the cover also has a seat with a sloping bottom which snugly engages the terminal 70 and its arms 78 to hold such terminal and the switch 12 firmly in place. The outside of the cover 112 preferably has recesses 146 into which the lugs 40 fit when bent over to retain the assembled parts within the housing 22. The cover 112 also has a threaded opening 148 to receive an Allen type screw 150 which may be adjusted to limit the open position of the contact arm 82. After the assembly of the insulating support and cover the coupler 114 is frictionally attached to the outer end 108 of the customer-adjustable stem 18. The coupler 114 has a flange 152 and an outer cylindrical stem 114a having a flatted portion 154. An escutcheon plate 156 with a coupler-receiving opening 158 is fitted over the coupler 114. This plate seats on shoulders 160 on the wall 24 and when so seated bears against the flange 152 to thus prevent the stem 18 from moving axially, thus keeping the end 106 seated in bearing 54. Slots 162 in the plate 156 receive lugs 164 adjacent the shoulders 160 and these lugs are bent over to retain the plate in position. The plate may have holes 166 by which it is mounted to the refrigerator. The plate thus acts as a mounting bracket for the unit. It also carries suitable indicia for the customer-adjustable knob 168.

By having the adjusting mechanism interposed directly between the offset portion 92 of the switch actuator 88 and the boss 28 on the power element 10 the accuracy of the device is greatly increased, the construction and assembly simplified, and the accuracy of adjustment of the device is facilitated. The power element 10 with its housing 22 constitutes one sub-assembly. The cams 14 and 16, the switch 12 and terminals 62 and 70 assembled between the body 42 and cover 112 constitute a second sub-assembly. This second unit is readily inserted and secured within the housing 22. The coupler 114 and escutcheon plate 156 are assembled as described and the knob 168 applied. The user-adjustment cam 14 is placed in recess 52. Then the factory-adjustment cam 16 is placed in recess 56. Next the terminal 62 is placed within the seat 60. Then the electric switch part 12 is poisitioned on seat 64 and terminal 70 placed over the electric switch part 12. Finally the cover 112 is seated upon the member 42 and held thereagainst by the bent over lugs 40.

As has been explained the electric snap switch when assembled is normally biased to open position (Fig. 9). When the refrigerator is below the set temperature or the user-adjustable cam 14 is set at "off" position (designated by "O" in Fig. 1) the force in actuator 88 will cause it and the cams 14 and 16 to move toward the outer (right-hand) limit with the switch off. When the temperature rises in the refrigerator and approaches the set temperature the thermally responsive fluid in the power element causes the diaphragm 26 to move the boss 28 toward the cam 14. This cam and the cam 16 will both be moved toward the left and the switch actuator 88 is moved over center to snap the switch to "on." The length of the movement necessary to cause this snap action may be decreased or increased by turning the screw 150 inwardly for less length and outwardly for greater length. If there is no change in temperature the switch may be closed by turning the customer-adjustable cam (clockwise) until the desired temperature is below the actual temperature.

Although in Figs. 8, 9 and 10, I have, for simplicity, shown a diaphragm 26 of substantially smooth or flat form, it is to be understood that I prefer to provide diaphragm 26 with undulations or corrugations, as shown in Fig. 1, and in my aforementioned application, Ser. No. 257,100, filed November 19, 1951.

I claim:

1. In a user-adjustable automatic control, a temperature responsive power element having a cam follower, an electric snap switch, an actuator for said switch, a cam between said follower and said actuator, adjusting means for moving said cam to vary the distance between said follower and said actuator, and resilient mounting means for said cam permitting axial movement between said cam and said adjusting means.

2. A control as claimed in claim 1, in which there is a second adjustable cam also located between said follower and said actuator, said second cam being movable with said first cam along the line between said follower and said actuator without disturbing the camming adjustment.

3. In a user-adjustable automatic control for regulating temperature, a power element having a flexible diaphragm provided with a boss, an electric snap switch, an actuator for said switch, means for transmitting motion between said power element and said switch comprising a cam between said boss and said actuator, adjusting means for moving said cam to vary the distance between the portions thereof respectively engaging said boss and said actuator, and means connecting said cam and said adjusting means to permit said cam to move jointly with said boss and said actuator without disturbing its camming adjustment.

4. A control as claimed in claim 3, in which there is a second adjustable cam also located between said boss and said actuator, said cams being movable with said boss and said actuator without disturbing the adjustment of either cam.

5. In a user-adjustable automatic control for regulating temperature in a domestic refrigerator, a power element having a flexible diaphragm provided with a boss movable in response to changes in ambient conditions, an electric snap switch fixedly mounted with respect to said power element, an actuator for said switch, a boss on said actuator, a cam between said bosses to transmit motion between said power element and said switch, adjusting means for moving said cam to vary the distance between the boss-engaging portions thereof, and connecting means between said cam and said adjusting means to permit said cam to move with said bosses without disturbing its camming adjustment.

6. A control as claimed in claim 5, in which there is a second adjustable cam between said bosses, said cams being movable with said bosses without disturbing the adjustment of either cam.

7. In a user-adjustable automatic control for regulating temperature in a domestic refrigerator, a power element having a flexible diaphragm movable in response to changes in temperature and having a cam follower formed integrally therewith, an electric snap switch fixedly mounted with respect to said power element, an actuator for said switch, a cam follower formed integrally with said actuator, means for transmitting motion between said power element and said switch comprising a cam between said followers, rotatable adjusting means for moving said cam to vary the distance between the follower-engaging portions thereof, said adjusting means having its axis of rotation offset laterally with respect to the line of engagement of said followers with said cam, means connecting said cam and said adjusting means to permit said cam to move jointly with said followers without disturbing its camming adjustment.

8. A control as claimed in claim 7, in which there is a second adjustable cam also located between said followers, said second cam being movable jointly with said first cam between said followers without disturbing the adjustment of said cams.

9. Adjusting means for varying the transmission of motion between a power element and an electric snap switch, said element and said switch having adjusting means engaging portions in spaced alinement with each other, comprising an arcuate shaped cam having oppositely related surfaces between said portions, a rotatable stem positioned to one side of the line between said portions, and a connection between said cam and said stem whereby angular movement is transmitted therebetween to place different parts of said cam between said portions while permitting said cam to have relative movement axially of said stem.

10. Adjusting means as claimed in claim 9, in which said cam is made of molded nylon with said connection consisting of a thin flexible web integrally connecting said cam and stem.

11. Adjusting means for varying the transmission of motion between a power element and an electric snap switch, said element and said switch respectively having adjusting means engaging portions in spaced alinement, comprising an arcuate-shaped cam having oppositely related surfaces between said portions, a rotatable stem positioned to one side of the line between said portion, a flexible connection between said cam and said stem whereby angular movement is transmitted therebetween to place different parts of said cam between said portions while permitting said cam to have relative movement axially of said stem, a second arcuate-shaped cam having oppositely related surfaces between said first cam and one of said portions, a second rotatable stem positioned to one side of the line between said portions, and a flexible connection between said second cam and said second stem whereby angular movement is transmitted therebetween to place a different part of said second cam between said first cam and one of said portions while permitting said second cam to have relative movement axially of said second stem.

12. Adjusting means as claimed in claim 11, in which said cams are made of molded nylon with said flexible connection consisting of thin webs integrally connecting said cams and stems.

13. A user-adjustable control device, comprising a power element having a housing with an extended wall, a diaphragm within said housing, an insulating member positioned within said housing adjacent said diaphragm, said member and said wall having abutting portions for accurately positioning said member with respect to said diaphragm, an electric snap switch mounted in said member, said switch having an actuator in alinement with said diaphragm, means mounted in said member for transmitting motion between said diaphragm and said actuator, and parts on said wall deformed to hold said member in place.

14. A control device as claimed in claim 13, in which said means consists of a cam positioned between said diaphragm and said actuator, a stem extending from said means to actuate said cam, and a member connecting said cam and said stem to transmit angular movement therebetween and permit said cam to have relative movement axially of said stem.

15. A control device as claimed in claim 13, in which said means consists of a pair of crossed arcuate-shaped cams, each of said cams having an adjusting stem and a flexible connection between each stem and its associated cam, said stems being mounted in said member, one of said stems projecting beyond said insulating member whereby adjustment may be made by a control user, and an opening in said member providing access to the other of said stems.

16. Adjusting means for varying the transmission of motion between a power element and an electric snap switch, said element and said switch having adjusting means engaging portions in spaced alinement with each other, comprising a circular cam having oppositely related surfaces between said portions, a rotatable stem for said cam positioned to one side of the line between said portions, said cam and said stem being interconnected by a thin web-like member having sufficient strength to transmit angular movement from said stem to said cam, said web being provided with annular corrugations to facilitate axial movement of said cam under the influence of said power element.

17. A user-adjustable control comprising a power element having a housing with an extended wall, a diaphragm within said housing, an insulating member positioned within said housing adjacent said diaphragm, said member and said wall having abutting portions for accurately positioning said member with respect to said diaphragm, an electric snap switch mounted in said member, said switch having an actuator in alinement with said diaphragm, means mounted in said member for transmitting motion between said diaphragm and said actuator, a stem extending from said member for adjusting said means, a coupler on said stem, parts on said wall holding said member in place, a mounting plate adjacent said member and bearing on said coupler, and parts on said wall positioning said plate with respect to said member and coupler and locking said plate in place.

18. An adjustable control for use with a power element comprising: an insulating supporting member consisting of a body and a cover; said body having an opening through which motion is transmitted from the power element and a circular recess the center of which is offset from said opening; an annular cam in said recess in alinement with said opening, an adjusting stem associated with said cam; an electric snap switch mounted in said body and held in place by said cover, said switch having an actuator in operable alinement with said cam; said cover having an opening through which said stem extends; and means for holding said stem against axial displacement while permitting rotation thereof to adjust said cam.

19. A control as claimed in claim 18, in which there is a second adjustable cam interposed between said power element and said actuator, said cams being jointly movable with said power element and said actuator without disturbing the adjustment of either cam.

20. A control as claimed in claim 18, in which there is a second adjustable cam of arcuate form interposed between said power element and said actuator, said cams being so arranged that their operative surfaces cross each other at approximately right angles, said cams being jointly movable with said power element and said actuator without disturbing the adjustment of either cam.

21. An adjustable control as claimed in claim 18, in which said switch includes: a fixed contact and a movable contactor interposed between said body and said cover; an actuator for said contactor; said actuator being arranged to normally effect bias of said contactor to a given position; and means interconnecting said actuator and said movable contactor so that movement of either one beyond an over-center line causes a snap action of said movable contactor; said contactor and said actuator being mounted in slanted relationship to said fixed contact so that engagement between said fixed contact and said movable contactor causes said movable contactor to be out of said over-center line when said actuator is unaffected by said cam.

IRVIN W. COX.

References Cited in the file of this patent
UNITED STATES PATENTS

| Number | Name | Date |
| --- | --- | --- |
| 2,194,533 | Van Dyke | Mar. 26, 1940 |
| 2,556,716 | Viol | June 12, 1951 |